(12) United States Patent
Kim et al.

(10) Patent No.: US 8,982,098 B2
(45) Date of Patent: Mar. 17, 2015

(54) PORTABLE DEVICE HAVING THE TOUCH LOCK STATUS AND OPERATION SYSTEM THEREOF

(71) Applicant: Samsung Electronics Co., Ltd., Gyeonggi-do (KR)

(72) Inventors: Tae Yeon Kim, Seoul (KR); Sung-Sik Lee, Gyeonggi-do (KR); Il Geun Bok, Seoul (KR); Hyun Kyung Shin, Kongens Lyngby (DK)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/274,868

(22) Filed: May 12, 2014

(65) Prior Publication Data
US 2014/0242967 A1 Aug. 28, 2014

Related U.S. Application Data

(63) Continuation of application No. 13/113,346, filed on May 23, 2011, now Pat. No. 8,749,516.

(30) Foreign Application Priority Data

May 26, 2010 (KR) ........................ 10-2010-0049029

(51) Int. Cl.
G06F 3/045 (2006.01)
H04W 24/02 (2009.01)
G06F 1/16 (2006.01)
G06F 3/0488 (2013.01)

(52) U.S. Cl.
CPC ............. H04W 24/02 (2013.01); G06F 1/1643 (2013.01); G06F 3/04883 (2013.01)
USPC .......................................... 345/174; 345/176

(58) Field of Classification Search
USPC .................... 345/173–183; 178/18.01–18.09, 178/20.01–20.04
See application file for complete search history.

(56) References Cited

U.S. PATENT DOCUMENTS

| 7,505,799 | B2 | 3/2009 | Suzuki et al. |
| 8,331,992 | B2 | 12/2012 | Stallings et al. |
| 8,640,057 | B2 | 1/2014 | Chaudhri et al. |
| 8,749,516 | B2 * | 6/2014 | Kim et al. ................... 345/174 |
| 2006/0189345 | A1 | 8/2006 | Suzuki et al. |

(Continued)

FOREIGN PATENT DOCUMENTS

| KR | 10-2006-0086589 A | 8/2006 |
| KR | 10-2007-0024165 A | 3/2007 |

(Continued)

*Primary Examiner* — Vijay Shankar
(74) *Attorney, Agent, or Firm* — Cha & Reiter, LLC

(57) ABSTRACT

A mobile device with a touch panel and a touch-lock operating method thereof are provided. The mobile device preferably includes an RF communication unit for supporting communication services; a touch panel for sensing input touches; a display unit for displaying a screen, where the screen includes at least one of a preset image, text, and map; and a controller for setting a touch-lock in the touch panel according to a preset condition. The controller also controls the display unit to display at least one of a text and image or at least one particular icon corresponding to the information reception event that occurs, based on the RF communication unit, in the touch-lock state. A portion of the display screen can be locked, or only certain predetermined touch functions permitted.

30 Claims, 7 Drawing Sheets

(56) References Cited

U.S. PATENT DOCUMENTS

| | | |
|---|---|---|
| 2007/0049358 A1 | 3/2007 | Kang et al. |
| 2008/0220752 A1 | 9/2008 | Forstall et al. |
| 2009/0061837 A1 | 3/2009 | Chaudhri et al. |
| 2010/0001967 A1 | 1/2010 | Yoo |
| 2010/0159995 A1 | 6/2010 | Stallings et al. |
| 2010/0306705 A1 | 12/2010 | Nilsson |
| 2010/0306718 A1 | 12/2010 | Shim et al. |
| 2012/0009896 A1 | 1/2012 | Bandyopadhyay et al. |
| 2012/0129496 A1 | 5/2012 | Park et al. |

FOREIGN PATENT DOCUMENTS

| | | |
|---|---|---|
| KR | 10-2007-0048471 A | 5/2007 |
| KR | 10-2007-0108620 A | 11/2007 |
| KR | 10-2009-0012836 A | 2/2009 |
| KR | 10-2010-0005438 A | 1/2010 |

\* cited by examiner

PORTABLE DEVICE HAVING THE TOUCH LOCK STATUS AND OPERATION SYSTEM THEREOF

CROSS REFERENCE TO RELATED APPLICATIONS

The present application is a Continuation of U.S. application Ser. No. 13/113,346 filed on May 23, 2011 which claims priority under 35 U.S.C. §119 from Korean Patent application No.: 10-2010-0049029 filed May 26, 2010, the contents of which are incorporated by reference in its entirety.

BACKGROUND

1. Technical Field

The present invention relates to electronic communication systems. More particularly, the invention is related to a mobile device with a touch screen that can provide or use information regarding its touch-lock state. The invention is also related to a method for operating a mobile device having a touch-lock state.

2. Description of the Related Art

Mobile devices are widely used because they can be easily carried and provide a wide variety of functions that extends far beyond a voice call function. Mobile devices are equipped with various input mechanisms to provide user functions. For example, input mechanisms can be implemented with a touch screen including a touch panel and a display unit. When mobile devices employ a touch screen, the touch screen can process a user's gesture to select a particular image displayed on the display unit, via the touch panel. After that, the mobile devices create a touch event corresponding to the user's gesture, and then control an application program corresponding to a user function according to the event.

Conventional mobile devices typically provide a 'touch-lock' function to lock the touch panel, thereby preventing touch events from occurring unintentionally. When a user intends to use a touch-locked mobile device, the user must first unlock the locked state in the mobile device. However, conventional mobile devices are disadvantageous in that, when they are locked with a touch-lock, they require a complicated touch event so that the touch-lock cannot be inadvertently unlocked by a user's simple gesture, and also require the user to perform complicated gestures to activate a particular user function.

SUMMARY

The present invention provides a mobile device that provides information regarding its various states to the user while in the touch-lock state.

The present invention further provides a method for operating the mobile device.

In accordance with an exemplary embodiment of the present invention, a mobile device having a touch-lock state preferably including: a radio frequency (RF) communication unit for supporting communication services; a touch panel for sensing input touches (contact); a display unit for displaying a screen, wherein the screen includes at least one of a preset image, text, and map; and a controller for setting a touch-lock in the touch panel according to a preset condition. The controller controls the display unit to display at least one of a text and image or at least one particular icon corresponding to the information reception event that occurs, based on the RF communication unit, in the touch-lock state.

In accordance with another exemplary embodiment of the invention, a method for operating a mobile device having a touch-lock state, preferably including: changing a current state to a touch-lock state in a touch panel of a touch screen; creating an information reception event via an RF communication unit in the touch-lock state; and displaying at least one of an image or text, and at least one icon, according to the information reception event, on a display unit in the touch-lock state.

In addition, in accordance with the present invention, detecting a change by a touch panel from a current state to a touch-lock state;

creating an information reception event in response to receiving information via a Radio Frequency (RF) communication unit while the mobile device is in the touch-lock state; and displaying on a display unit in the touch-lock state at least one of an icon or at least one of an image or text associated with the information reception event.

The method may also include partially releasing the touch-lock state in a particular region of the touch panel that corresponds to an area on which at least one icon is displayed; and performing a user function related to the icon according to a touch event that occurs in the particular region of the touch panel on which at least one icon is displayed; wherein the particular region of the touch panel is less than an entirety of the displayable area of the display unit.

In addition, the method may also include releasing the touch-lock of the touch panel after the user function is performed. The partially releasing of the touch-lock state permits a predetermined subset of user functions to be performed according to user selection.

The method may further comprise displaying a state information supporting icon area on the display unit in the touch-lock state; and displaying, when a particular icon associated with an information reception event is dragged to the state information supporting icon area, at least part of the information represented by the icon in the state information supporting icon area that was not previously visible.

The displaying of at least one icon or at least one of an image or text comprises at least one of the following: displaying a particular icon associated with a first information reception differently in size than at least one other icon associated with a second information reception event, according to the occurrence order of the information reception events; and displaying different forms of icons according to a plurality of respective types of information reception events.

BRIEF DESCRIPTION OF THE DRAWINGS

The exemplary features and advantages of the present invention will become more apparent from the following detailed description in conjunction with the accompanying drawings, in which.

DETAILED DESCRIPTION

Figure 1:
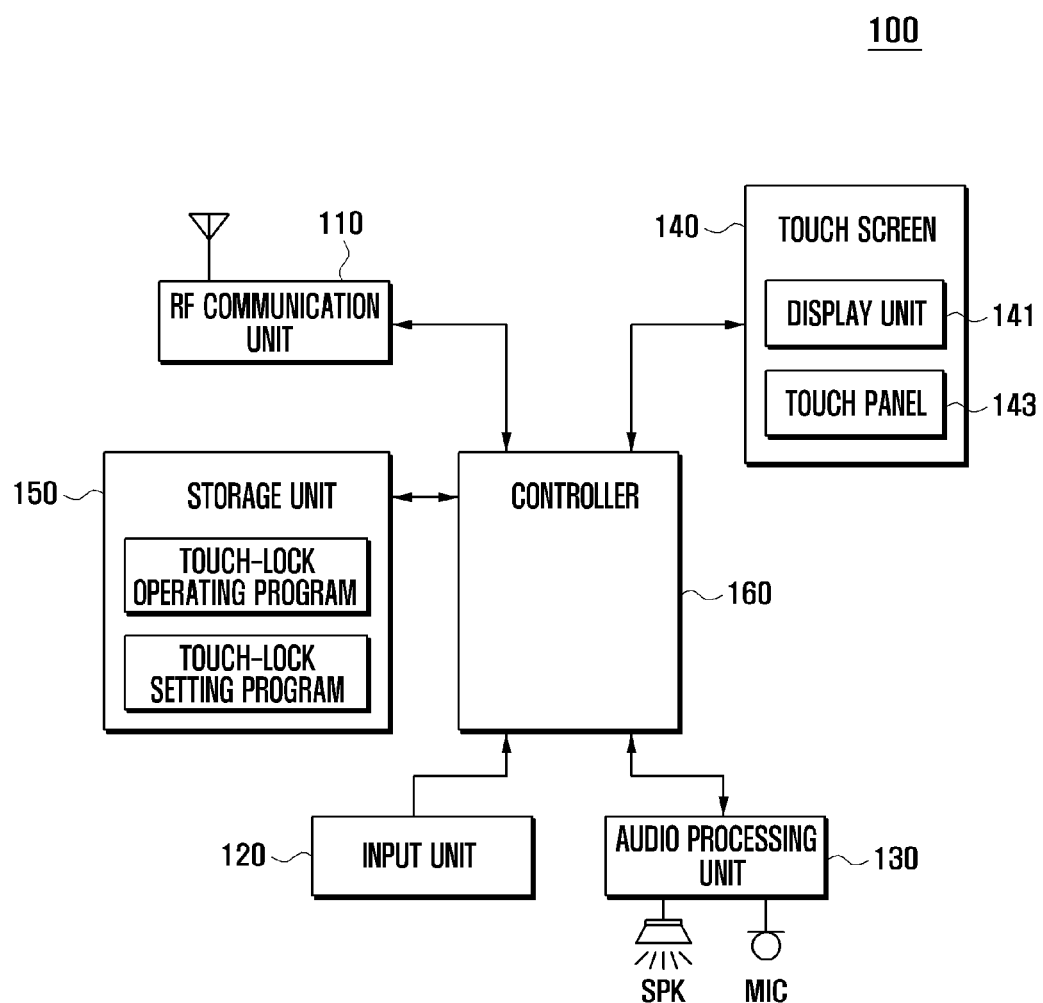
FIG. 1 illustrates a schematic block diagram of a mobile device according to an exemplary embodiment of the invention.

Hereinafter, exemplary embodiments of the invention are described in detail with reference to the accompanying drawings. The same reference numbers are used throughout the drawings to refer to the same or similar parts. Detailed descriptions of well-known functions and structures incorporated herein may be omitted to avoid obscuring appreciation of the subject matter of the invention by a person of ordinary skill in the art.

The terms or words described in the present description and the claims should not be limited by a general or lexical meaning, instead should be analyzed as a meaning and a concept through which the inventor defines and describes the invention at his most effort, to comply with the idea of the invention. Therefore, one skilled in the art will understand that the exemplary embodiments disclosed in the description and configurations illustrated in the drawings are only preferred embodiments, instead there may be various modifications, alterations, and equivalents thereof to replace the embodiments at the time of filing this application.

FIG. 1 illustrates a schematic block diagram of a mobile device according to an exemplary embodiment of the invention.

Referring now to FIG. 1, the mobile device 100 includes an RF communication unit 110, an input unit 120, an audio processing unit 130, a touch screen 140, a storage unit 150, and a controller 160. The touch screen 140 is comprised of a display unit 141 and a touch panel 143.

When a particular event according to a user function occurs in the mobile device 100 while the mobile device 100 is in a touch-lock state, the mobile device 100 displays the state information according to the event on the display unit 141. The mobile device 100 of the invention preferably provides information according to the state alternation of the mobile device 100 while being in a touch-lock state, so that the user can easily acquire the information. In the following description, the components in the mobile device 100 are explained in detail.

The term 'touch-lock' state may occur in part of the entire area of the touch panel 143. A 'touch-lock' state refers to a state that ignores a touch gesture or limits a function performed according to the input touch gesture.

When the mobile device 100 is configured to provide a communication function, it may optionally include the RF communication unit 110. Likewise, when the mobile device 100 is configured to have a function for outputting audio data, it may optionally include the audio processing unit 130. Accordingly, the RF communication unit 110 and the audio processing unit 130 may be omitted from the mobile device 100 according to the mobile device manufacturers' designs.

With continued reference to FIG. 1, the RF communication unit 110 establishes a communication channel for a voice call or a video call and a communication channel for transmitting data, such as video data, messages, etc., under the control of the controller 160. In other words, the RF communication unit 110 establishes a voice call channel, a data communication channel, and a video call channel with an external mobile communication system. To this end, the RF communication unit 110 preferably includes an RF transmitter for up-converting the frequency of signals to be transmitted and amplifying the signals and an RF receiver for low-noise amplifying received RF signals and down-converting the frequency of the received RF signals. A user function based on the RF communication unit 110 is preferably selected and activated according to a touch event that occurs on the touch panel 143 or according to an input signal created via the input unit 120. The RF communication unit 110 receives information regarding messages, calls, emails, etc. and then transfers the information to the controller 160. When the mobile device user misses messages, calls, emails, etc., information regarding corresponding states for the missed messages, calls, or emails may be displayed on the touch screen 140 that is retaining a touch-lock state, according to the control of the controller 160.

The input unit 120 typically includes input keys and function keys that allow the user to input numbers or letter information and to set a variety of functions. The function keys include direction keys, side keys, shortcut keys, etc., which are set to perform specific functions. The input unit 120 creates key signals for setting user's options and for controlling functions of the mobile device 100 and transfers them to the controller 160. The input unit 120 can be implemented with a QWERTY keypad, DVORAK keypad, a 3×4 keypad, a 4×3 keypad, etc., just to name a few possibilities. Alternatively, the input unit 120 may be implemented with a key map on the touch screen 140. In that case, the key map may be a QWERTY key map, a DVORAK key map, a 3×4 key map, a 4×3 key map, or the like, including a menu map, control map, etc. When the touch screen 140 is implemented with a full-touch-screen type, the input unit 120 may include only side keys installed to the body of the mobile device 100. In that case, the input unit 120 can provide a hot key that can unlock a touch-lock state of the mobile device 100.

The audio processing unit 130 preferably includes a speaker (SPK) and a microphone (MIC). The audio processing unit outputs, via the speaker, audio data that is transmitted during the call, is included in a received message, and is created when an audio file stored in the storage unit is played back. The audio processing unit receives a user's voice during the call or other audio signals via the microphone. The audio processing unit 130 can output sound effects when the mobile device 100 is locked to a touch-lock state or unlocked from the touch-lock state. When information reception events based on the RF communication unit 110 occur in the mobile device 100 operating in a touch-lock state, the audio processing unit 130 can output particular sounds according to types of information reception events that occur. Some examples of the information reception events discussed herein include a message reception event, an email reception event, and a call reception event. The audio processing unit 130 can also output various types of sounds corresponding to missed information reception events, according to a user's settings. When a touch event to release a touch-lock occurs on the touch screen 140 when the mobile device 100 is in a touch-lock state or a touch event to activate a particular state occurs on the touch screen 140 when the mobile device 100 is in a touch-lock state, the audio processing unit 130 may output a sound corresponding to the touch event that occurred. The audio processing unit 130 may not output sound effects according to a user's settings or a mobile device manufacturer's settings.

With continued reference to FIG. 1, the touch screen 140 includes a display unit 141 and a touch panel 143, where the touch panel 143 is installed to the front of the display panel 141. The size of touch screen 140 is determined as that of the touch panel 143.

The display panel 141 displays menus of the mobile device 100, and information input by a user or information provided to the user. That is, the display panel 141 provides various types of screens according to the operation of the mobile device 100, such as an idle screen, menu screens, a message writing screen, a call screen, etc. The display unit 141 may be implemented with a Liquid Crystal Display (LCD), an Organic Light Emitting Diode (OLED), or any type of thin film screen display or the like. The display unit 141 may be located on or under the touch panel 143. In an exemplary embodiment of the invention, when the mobile device 100 is locked to a touch-lock state, the display unit 141 can display state information created according to a user's function activation under the control the controller 160. In addition, the display unit 141 can also display an optional screen that allows the user to select modes to display the state information. The user functions that create state information in a touch-lock state preferably include an information reception event function related to the RF communication unit 110, a function to activate a touch-lock standby screen, etc. The display unit 141 can display a screen for showing an information reception event, a touch-lock output screen, etc. User interfaces displayed on the display unit 141 will be described, in detail, infra, referring to FIGS. 3 and 4.

The touch panel 143 is preferably located on at least one of the upper and lower portions of the display unit 141. The touch panel 143 senses a touch event according to a received touch or an access distance of an object, and transfers information about the touch event to the controller 160. The touch panel 143 includes sensors arranged in a matrix form. The sensors sense a touch event that occurs on the touch panel 143 and transfer information regarding a location where the touch event occurred and information regarding the types of touch event that occurred to the controller 160.

The controller 160 receives the location information and determines the type of touch event, via the touch event information transferred from the touch panel 143, checks particular information regarding the display unit 141, mapped to a corresponding location, and then activates a user function linked to the particular information.

In particular, when the mobile device 100 is locked via a touch-lock, the touch panel 143 is preferably controlled so a part of the entire area of the touch panel 143 may serve as a region for unlocking the touch-lock state according to the occurrence of state information regarding the mobile device 100. That is, a portion of the touch panel 143 is used to unlock a touch-lock of a region corresponding to a particular area of the display unit 141, according to the control of the controller 160. When icons, texts, or images corresponding to state information are displayed on the display unit 141, the touch panel 143 is used to unlock a touch-lock of a region on which the displayed elements are displayed. Partially unlocking the touch-lock of the touch panel 143 means that the touch-lock of the particular portion of the touch panel 143 is simply unlocked and also that a particular type of a touch event that may occur on a corresponding area is limited. For example, according to the control of the controller 160, with respect to the state where the mobile device 100 is touch-locked, the touch panel 143 can be limited in such a manner to recognize, as an effective event, only a double touch down event or a drag event that occurs in an area where the touch-lock is partially unlocked. The double touch down event or the drag event may be replaced with other types of touch events according to the mobile device manufacturers' settings or the user's settings.

In addition, the touch panel 143 can sense a touch event, which occurs in an area where the touch-lock is partially unlocked, as a shortcut function depending on situations, according to the control of the controller 160. The touch panel 143 may include a number of areas where the touch-lock is partially unlocked. In that case, the touch panel 143 can support associating and integrating touch events between the areas where the touch-lock is partially unlocked with each other. The operation of the touch panel 143 will be described in more detail when the controller is fully discussed hereinafter.

With continued reference to FIG. 1, the storage unit 150 stores application programs for executing functions according to the invention. The storage unit 150 cans store a menu map or a key map for operating the touch screen 140, information regarding an area where the touch-lock is partially unlocked, etc. The key map and menu map can be implemented with various modes. For example, the key map may be a keyboard map, a 3×4 key map, a QWERTY key map, a DVORAK key map, a control key map, etc. for controlling an application program that is currently executed, etc. In addition, the menu map may be a menu map for controlling an application program that is currently activated. The storage unit 150 is preferably comprised of a program storage area and a data storage area.

The program storage area stores an operating system (OS) for booting the mobile device 100 and operating the components included therein. The program storing area also preferably stores application programs for reproducing a variety of files, such as an application program for supporting a voice call function, a web browser function for accessing an Internet server, an application program for audio sources, such as an MP3 file, an application program for reproducing photographs, images, moving images, etc. In an exemplary embodiment of the invention, the program storage area stores a touch-lock operating program and a touch-lock setting program. It is within the spirit and scope of the claimed invention that these programs could be modules of a single application.

The touch-lock setting program may be loaded on the controller 160 when the user selects and activates one of the menu items to set a touch-lock or activates a particular key to which a touch-lock setting function is allocated. The touch-lock setting program preferably includes a number of routines. Some examples of the routines preferably include: a routine for providing items corresponding to user functions of the mobile device 100; a routine for registering one of the items corresponding to user functions, selected by an input signal created via the input unit 120 or the touch screen 140, to a touch-lock setting menu; a routine for storing the item selected via the touch-lock setting menu; a routine for deleting the items, registered via the touch-lock setting menu, according to the user's input; and so on. The user can select a particular image, an avatar, etc., to be displayed on the touch-lock idle screen, via the touch-lock setting program. The particular image and avatar may have a function to be altered according to the occurrence of state information regarding the mobile device 100, which will be described in detail later referring to the accompanying drawings.

The touch-lock operating program may be activated according to the control of the controller 160 when the mobile device 100 is touch-locked. The touch-lock operating program preferably includes: a routine for detecting the alternation to a touch-lock state of the mobile device 100; a routine for displaying state information regarding the mobile device 100 according to a touch-lock setting menu, stored in the storage unit 150, when an alteration to a touch-lock state occurs in the mobile device 100; a routine for displaying a state information supporting icon on the display unit 141; and a routine for setting only an area of the display unit 141, on which an element corresponding to the state information is displayed, and only an area of the touch panel 143, corresponding to that of the display unit 141, on which the state information supporting icon is displayed, as an effective area where a partial touch event occurs. When an additional input signal does not occur on the input unit 120 and the touch screen 140 for a preset period of time, the touch-lock state alteration detecting routine can recognize a corresponding situation as a signal to alter a current state to a touch-lock state. In addition, when a preset input signal occurs, the touch-lock state alteration detecting routine recognizes the signal as the alteration to the touch-lock state in the mobile device 100.

The data storage area refers to an area where data, generated when the mobile device 100 is used, is stored. That is, the data storage area stores a variety of contents, such as phone book data, and at least one icon related to widget functions. The data storage area stores also stores user's inputs via the touch panel 143, and there can be more than one storage unit 150 or type of storage. In an exemplary embodiment of the invention, the data storage area can store information reception events created when the RF communication unit 110 receives signals. In other words, the data storage area can store events according to the reception of messages or emails, a missed call event occurred when no reply responding to a call connection request is received, etc.

The controller 160 may control electric power supplied to the components of the mobile device 100 and controls performance of their initialization process. The controller 160 determines whether the mobile device 100 is altered to a touch-lock state. When the controller 160 ascertains that the mobile device 100 is altered to a touch-lock state, it processes the information reception events according to the routine of the touch-lock operating program and displays a touch-lock idle screen. To this end, the controller 160 includes the components as shown in FIG. 2.

Figure 2:
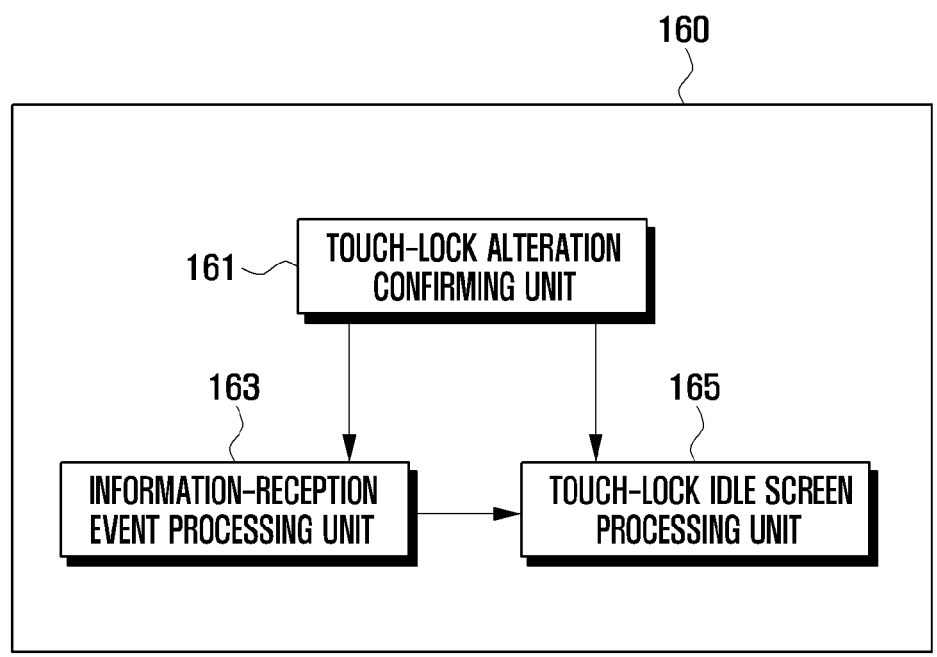
FIG. 2 illustrates a detailed view of the controller included in the mobile device shown in FIG. 1.

FIG. 2 illustrates a detailed view of the controller 160 included in the mobile device shown in FIG. 1.

The controller 160 includes a touch-lock alteration confirming unit 161, an information-reception event processing unit 163, and a touch-lock idle screen processing unit 165.

With continued reference to FIG. 2, the touch-lock alteration confirming unit 161 determines whether the mobile device 100 is in a touch-lock state. To this end, the touch-lock alteration confirming unit 161 checks the condition of the touch lock status to change the mobile device 100 into a touch-lock state. In other words, the touch-lock alteration confirming unit 161 determines whether an input signal for a touch-lock occurs in the input unit 120 of the mobile device 100. Alternatively, the touch-lock alteration confirming unit 161 may determines whether or an input signal occurs within a preset period of time. When the touch-lock alteration confirming unit 161 ascertains that an input signal does not occur within a preset period of time, it concludes that such a situation is to set the mobile device 100 in a touch-lock state. Thus, the touch-lock state can be a predefined or user-select default that is operative after a certain period of time. In addition, when a touch event for setting the mobile device 100 in a touch-lock state occurs on the touch panel 143, the touch-lock alteration confirming unit 161 determines that the touch event is to set the mobile device 100 in a touch-lock state. When the touch event for setting the touch panel 143 in a touch-lock state has occurred, the touch-lock alteration confirming unit 161 sets the touch panel 143 to a touch-lock state, and then transfers the signal reporting the touch-lock state of the touch panel 143 to the information-reception event processing unit 163 and the touch-lock idle screen processing unit 165.

With continued reference to FIG. 2, when the information-reception event processing unit 163 receives the signal reporting the touch-lock state of the touch panel 143 from the touch-lock alteration confirming unit 161, the information-reception event processing unit 163 processes an information reception event according to the touch-lock alteration. When the touch panel 143 is set in a touch-lock state, the information-reception event processing unit 163 monitors the RF communication unit 110 to determines whether an information reception event occurs. When the information-reception event processing unit 163 ascertains that an information reception event occurs, the unit 163 can cause the display at least one of a particular icon, an image, and text, on the display unit 141, according to the type of the information reception event. The following exemplary embodiment will now be described such that the information-reception event processing unit 163 displays a particular icon corresponding to an information reception event on the display unit 141. When the display unit 141 displays an icon corresponding to a particular type of information reception event, the information-reception event processing unit 163 can partially activate a region of the touch panel 143, in the area on which a corresponding icon is displayed.

When another information reception event occurs after the information reception event additionally occurs, the information-reception event processing unit 163 can adjust the form of an icon to be displayed on the display unit 141, according to the type of the information reception event that has additionally occurred. When another information reception event that has additionally occurred is identical to the information reception event that previously occurred in terms of the type, the information-reception event processing unit 163 can alter the icon displayed on the display unit 141 to display an accumulation icon for a corresponding information reception event, and then display it. On the contrary, when another information reception event that has additionally occurred differs from the information reception event that previously occurred in terms of the type, the information-reception event processing unit 163 can display a new icon on the display unit 141 and can also partially activate a region of the touch panel 143, corresponding to the newly displayed icon. In order to show that another information reception event that has additionally occurred is newer than the information reception event that previously occurred, the information-reception event processing unit 163 can display, on the display unit 141, an icon corresponding to the information reception event above the icon corresponding to the information reception event that has previously occurred.

When a preset or particular touch event occurs on a region of the touch panel 143, on which an icon is displayed and in which a touch-lock state is partially unlocked, the information-reception event processing unit 163 allows a user function corresponding to the icon to be performed. For example, when the icon is implemented with a message icon and a preset touch event occurs on the message icon, the information-reception event processing unit 163 causes display of a screen for checking the message. In that case, the information-reception event processing unit 163 may release the touch-lock state in the entire area of the touch panel 143. The control process of the information-reception event processing unit 163 will be described in more detail, hereinafter referring to the accompanying drawings.

When the touch-lock idle screen processing unit 165 receives the signal according to the touch-lock alteration of the touch panel 143 from the touch-lock alteration confirming unit 161, the touch-lock idle screen processing unit 165 preferably turns the display unit 141 off or activates a touch-lock idle screen image set in a touch-lock menu. The touch-lock idle screen image may be activated in cooperation with the information reception event function. The touch-lock idle screen image may be a growth form of an image. Therefore, the touch-lock idle screen processing unit 165 can vary the touch-lock idle screen image according to the accumulation of a particular element. The particular element may be time, etc. When an information reception event occurs, the touch-lock idle screen processing unit 165 can display a touch-lock idle screen image on the display unit 141, which differs from the touch-lock idle screen image that has been displayed before the occurrence of the information reception event. After that, the touch-lock idle screen processing unit 165 can display the newly displayed touch-lock idle screen image as an image that varies according to the accumulation of a particular element. An example of the particular element may be an occurrence amount of information reception events. The control process of the touch-lock idle screen processing unit 165 will be described in more detail hereinafter, with reference to the accompanying drawings.

Figure 3:
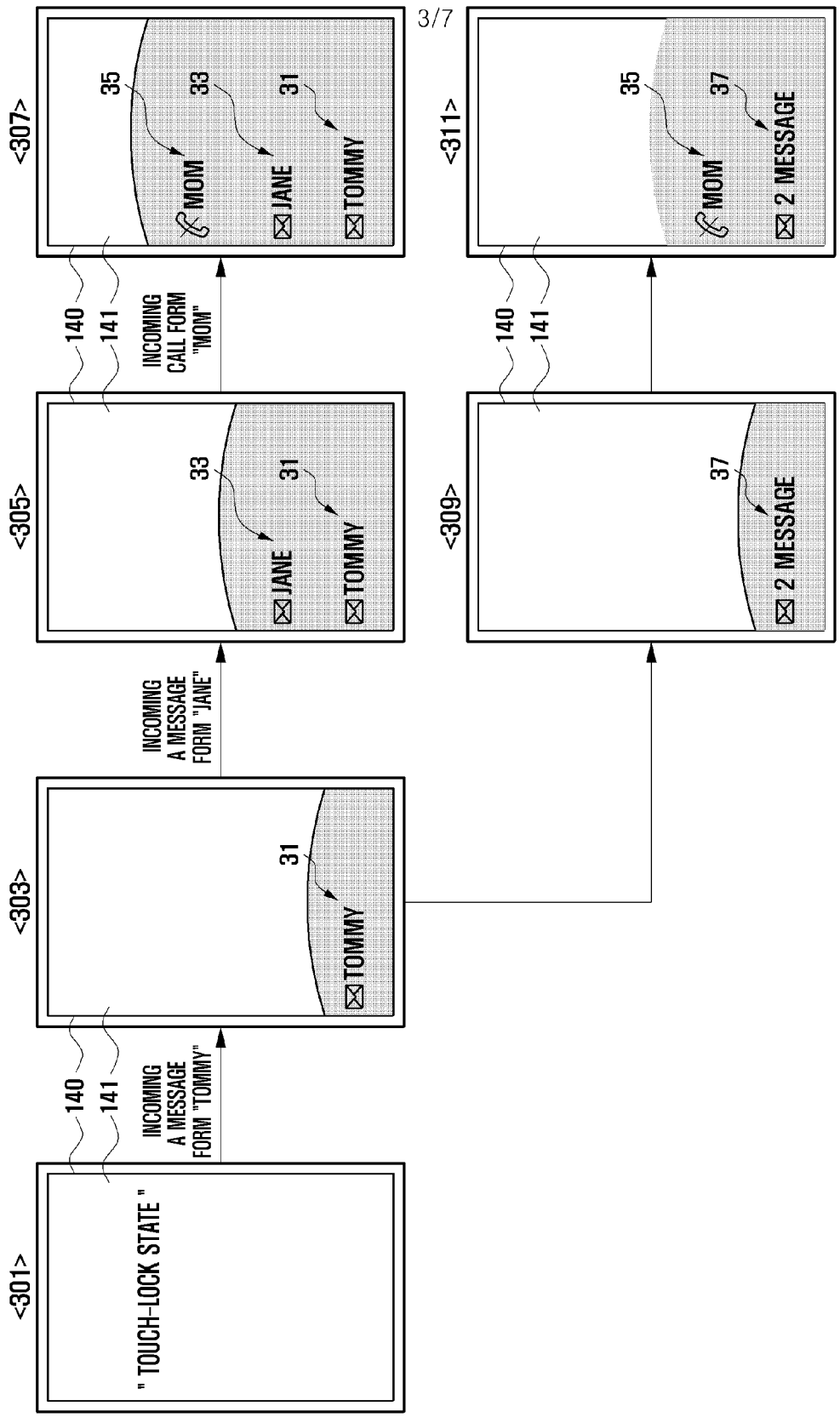
FIG. 3 illustrates screens that show the exemplary operations of the information-reception event processing unit and the touch-lock idle screen processing unit, according to an exemplary embodiment of the invention.

FIG. 3 illustrates screens that show the exemplary operations of the information-reception event processing unit 163 and the touch-lock idle screen processing unit 165, according to an exemplary embodiment of the invention.

Referring now to FIG. 3, when the mobile device 100 is turned on, the controller 160 initializes the components in the mobile device 100, and displays an idle screen according to preset schedule information or activates a particular user function. During this process, the mobile device 100 activates the touch panel 143 and then retains a state for awaiting touch inputs. When there is no signal for a preset period of time or an input signal for a touch-lock alteration occurs, the mobile device 100 preferably alters the current state of the touch panel 143 to a touch-lock state as shown in diagram 301, so that the display unit 141 is set to a state corresponding to the touch-lock state. In addition, the touch-lock idle screen processing unit 165 may control the display unit 141 to display a predetermined touch-lock idle screen image according to the touch-lock alteration. When the touch panel 143 is set in a touch-lock state, the touch-lock idle screen processing unit 165 activates a touch-lock operating program stored in the storage unit 150, and then monitors the RF communication unit 110 according to the activation of the program.

When an information reception event, i.e., a message reception event, occurs in the RF communication unit 110 while the touch panel 143 is retaining a touch-lock state as shown in diagram 301, the information-reception event processing unit 163 controls the display unit 141 to display a first icon 31, according to the message reception event, as shown in diagram 302. The first icon 31 may include image information representing a message reception event, information stating a message reception event, and sender's information for a message reception event. For example, when a person who is registered as "Tommy" in the phonebook sends a message, the first icon 31 includes an image representing a message and text containing "Tommy." On the contrary, when a person who is not registered in the phonebook sends a message, the first icon 31 may include the message sender's phone number instead of the sender's text, or it could say "unknown" or "undisclosed". Meanwhile, the touch-lock idle screen processing unit 165 can vary the idle screen image according to the occurrence amount of information reception events as shown in FIG. 3.

With continued reference to FIG. 3, the mobile device 100 may further receive messages from different senders. For example, as shown in diagram 305, when the mobile device 100 receives an incoming message from "Jane," the information-reception event processing unit 163 concludes that a message reception event has occurred. In that case, the information-reception event processing unit 163 can display a second icon 33 corresponding to the message sent from "Jane" on the display unit 141 in a touch-lock state. In addition, the information-reception event processing unit 163 displays the second icon 33 at the upper portion above the first icon 31, thereby allowing the user to intuitively recognize that the message represented by the second icon 33 is received later than the message represented by the first icon 31. It is also within the spirit and the scope of the invention that after a predetermined amount of time without the message being read, the display could make the envelope next to "Tommy" blink, or change color to red, or change size, and/or do the same to the name associated with the message. It is also possible to select certain names from the address book and flag them as priority. These messages can blink, change color, size, or appear at the top of a list of senders/callers. Meanwhile, the touch-lock idle screen processing unit 165 can process an idle screen image that shows an increase in the occurrence amount of information reception events according to the number of additionally received message reception events, as shown in FIG. 3.

In addition, the mobile device 100 may receive an incoming call. When the user does not answer the incoming call via the mobile device 100, the mobile device 100 recognizes that the incoming call is a missed call. In that case, the information-reception event processing unit 163 displays a third icon 35 representing a missed call event on the display unit 141 as shown in diagram 307. The third icon 35 is located above the second icon 33 on the display unit 141, thereby allowing the user to recognize that the information reception event representing the third icon 35 is the latest event. In an embodiment, as shown in FIG. 3, the third icon 35 may be comprised of an image representing a missed call and information regarding a sender, i.e., text information corresponding to the sender, "Mon" for example, when the sender's information was stored in the phone book. Meanwhile, the touch-lock idle screen processing unit 165 can process an idle screen image that shows the increase in the occurrence amount of information reception events, as described above.

With continued reference to FIG. 3, when an event according to the reception of an additional message occurs while the mobile device 100 is displaying the screen as shown in diagram 303, the information-reception event processing unit 163 controls the display unit 141 to display a fourth icon 37 representing the total number of message reception events, as shown in diagram 309. The fourth event 37 may be comprised of an image representing a message and text information representing the number of accumulated messages. When the same type of information reception event occurs, the touch-lock idle screen processing unit 165 can perform a control operation so as not to alter the size of the touch-lock idle screen image as shown in FIG. 3.

After that, when the mobile device 100 does not answer a call from a sender stored in the phone book, "Mom" for example, i.e., a missed call event occurs, the information-reception event processing unit 163 can display the third icon 35 at a higher position than the fourth icon 37 on the display unit 141 as shown in diagram 311. The touch-lock idle screen processing unit 165 can alter the size of the touch-lock idle screen image when events related to the reception of different information occur. Although it is not shown in the drawing, when the same event is accumulated, the touch-lock idle screen image may be altered according to the occurrence amount of accumulated events.

Figure 4:
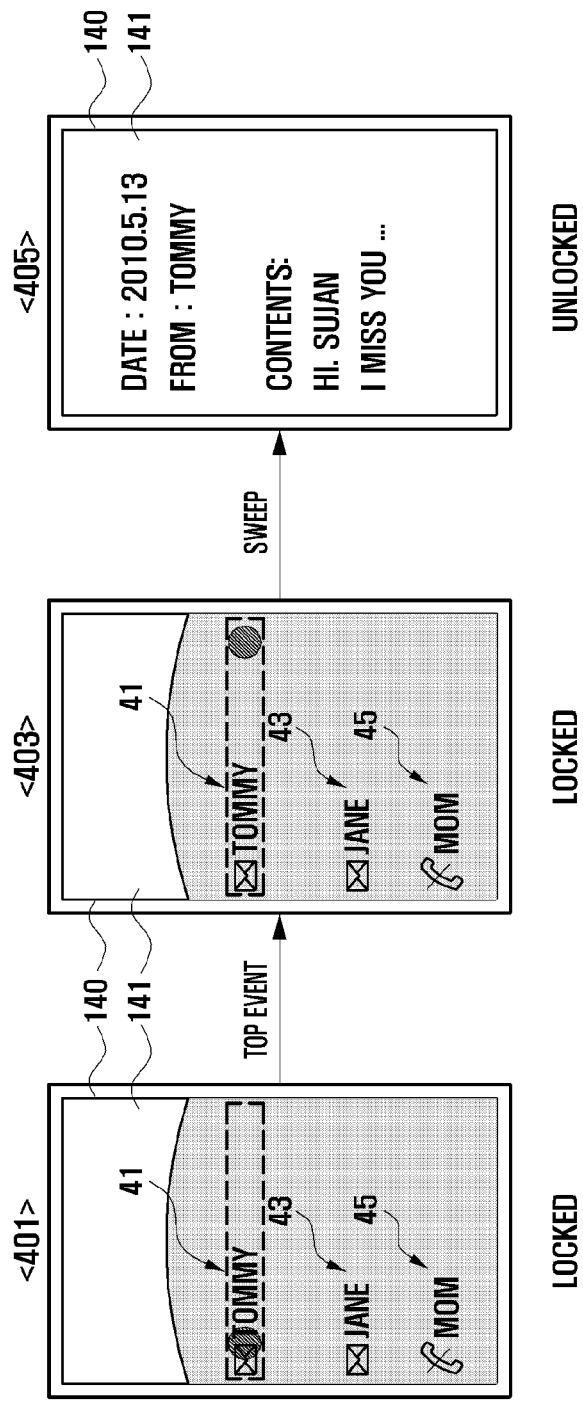
FIG. 4 illustrates screens that show the exemplary operation of the information-reception event processing unit, according to an exemplary embodiment of the invention.

FIG. 4 illustrates screens that show a shortcut function based on the operation of the information-reception event processing unit 163, according to an embodiment of the invention. It is assumed that the mobile device 100 is set in a touch-lock state and at least one or more information reception events occur therein.

Referring now to FIG. 4, two message reception events and one missed call event have occurred in the mobile device 100 in a touch-lock state, and accordingly the display unit 141 displays a first message icon 41, a second message icon 43 and a missed call icon 45. In order to intuitively represent the accumulated amount of icons, the touch-lock idle screen processing unit 165 can alter the idle screen image corresponding thereto. In other words, the touch-lock idle screen processing unit 165 can display different images to differentiate a region adjacent to an area displaying the first message icon 41 from the other regions. The information-reception event processing unit 163 can partially activate the area of the touch panel 143 on which the first 41 and second 43 message icons and the missed call icon 45 are displayed. The partial activation can permit, for example, partial or limited functionality.

When the mobile device 100 operates as described above, the user can touch the touch panel 143 on which the first message icon 41 is displayed. In that case, the touch-lock idle screen processing unit 165 can alter the form of the first message icon 41 so that differs, or is further distinguished from the others, so that the user can recognize the occurrence of the event that occurred according to his/her touch. That is, the touch-lock idle screen processing unit 165 can alter or highlight the area displaying the first message icon 41 or can display a particular image according to the input touch on the touched area, or change it size, make it blink, etc.

After that, when the user touches and drags his/her touch in a certain direction, for example, towards the right, the touch-lock idle screen processing unit 165 can display an image effect according to the drag on the display unit 141 as shown in diagram 403. For example, the touch-lock idle screen processing unit 165 can display a movement effect, where the touched image displayed on the display unit 141 is moved according to the drag gesture as shown in diagram 401, on the area on which the first message icon 41 is displayed on the display unit 141.

When a particular touch event occurs on the display unit 141 as shown in diagram 403, the touch-lock idle screen processing unit 165 may release the touch-lock state according to the touch event, and may also activate a particular user function corresponding to an information reception event. When a touch-drag event occurs from the first message icon 41 in a certain direction, the touch-lock idle screen processing unit 165 can conclude that the touch event corresponds to a command for viewing details of the first message icon 41. After that, the touch-lock idle screen processing unit 165 can display a screen for viewing details or a preview of the message, corresponding to the touched first message icon 41, as shown in diagram 405. In addition, the touch-lock idle screen processing unit 165 may also release the touch-lock state. On the other hand, the touch-lock idle screen processing unit 165 may remove the touch-lock idle screen image from the screen as shown in diagram 403. When the touch-lock idle screen processing unit 165 removes the touch-lock idle screen image, the controller 160 displays a detail view screen corresponding to the first message icon 41.

As described above, the mobile device 100 according to an exemplary embodiment of the invention can display icons according to information reception events in a touch-lock state, thereby allowing the user to intuitively recognize the types of information reception events that occurred. In addition, the mobile device 100 can be operated preferably in such a manner that the user selects and activates an icon area where the touch-lock state is partially released on the touch panel 143, and executes a particular user function of the icon when a particular touch event occurs in a corresponding area, and releases a touch-lock state according to a particular touch event or events.

Figure 5:
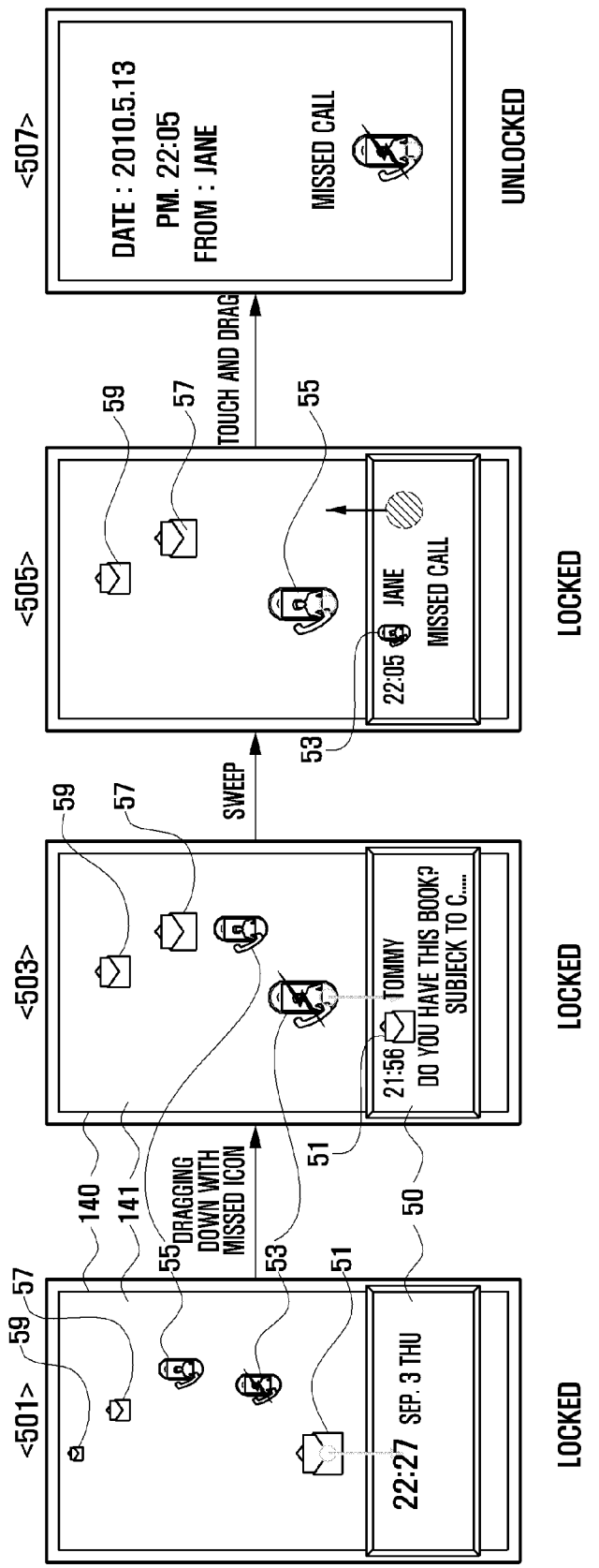
FIG. 5 illustrates screens that show the exemplary operations of the information-reception event processing unit and the touch-lock idle screen processing unit, according to another exemplary embodiment of the invention.

FIG. 5 illustrates screens that describe the operations of the information-reception event processing unit 163 and the touch-lock idle screen processing unit, according to another exemplary embodiment of the invention. It is assumed that the mobile device 100 is set in a touch-lock state and five or more information reception events occur therein.

Referring now to FIG. 5, when a variety of information reception events occur in the mobile device 100, the display unit 141 displays the icons corresponding thereto as shown in diagram 501. The mobile device 100 can display a state (i.e. status) information supporting icon 50 for activating a particular user function of the information reception event. The state information supporting icon 50 is located in a certain area on the display unit 141, which in this particular non-limiting example is on the bottom of the display screen. The state information supporting icon 50 may serve as an area on which particular information, such as current time information, etc., is displayed according to a user's settings or the mobile device manufacturers' settings. The state information supporting icon 50 may be displayed on the display unit 141 according to the control of the touch-lock idle screen processing unit 165. The area of the touch panel 143, on which the state information supporting icon 50 is displayed, may be partially unlocked from the touch-lock state.

As shown in diagram 501, the mobile device 100 can display a number of icons according to the information reception events on the display unit 141, for example, first 51, second 53, third 55, fourth 57 and fifth 59 information icons. In order to show the effect of the reception order of information, the display unit 141 displays icons corresponding to the received information such that the older information received is displayed as smaller icons, while newer information is displayed as larger icons. In other words, the icon corresponding to the oldest information received is displayed as the smallest icon. Simultaneously, the arrangement order is also aligned, according to the reception order of the icons. In addition, the icons may also be displayed in different images, according to the types of information reception events.

It should be understood that the property of the first 51, second 53, third 55, fourth 57 and fifth 59 information icons, shown in FIG. 5, is similar to that of the first icon 31 or the first message icon 41, the second icon 33 or the second message icon 43, the third icon 35 or the third missed call icon 45, shown in FIGS. 3 and 4. This differentiation is only used to conveniently describe this exemplary embodiment of the invention and not to limit the claimed invention thereto. The first information icon 51 refers to an icon corresponding to an event that occurs according to message reception. The second information icon 53 refers to an icon corresponding to an event that occurs according to a missed call. The third information icon 55 may also be an icon corresponding to an event that occurs according to a missed call. The information-reception event processing unit 163 may unlock a portion of an area of the touch panel 143, set in a touch-lock state, on which the respective icons are displayed.

When the area of the touch panel 143 set in a touch-lock state is partially unlocked, the user can input a signal to select (manipulate) the first information icon 51. That is, the user can touch the first information icon 51 on the touch panel 143, and drags the icon to the area of the state information supporting icon 50. In that case, the information-reception event processing unit 163 concludes that the first information icon 51 is dragged to the state information supporting icon 50, based on the touch event that occurred on the first information icon 51 and a touch down and up event that occurs on the state information supporting icon 50 after the first information icon 51 has been dragged.

Still referring to the example of the previous paragraph, the information-reception event processing unit 163 displays part of the message information, included in the first information icon 51, on the area of the state information supporting icon 50, as shown in diagram 503. A person of ordinary skill in the art should understand and appreciate that the size of part of the message information may be set differently according to a users' setting or the mobile device manufacturers' settings. The message information, displayed on the area of the state information supporting icon 50, may be a message sender's name, "Tommy," for example, or a part of message content together with the message sender's name, or a photo of Tommy pre-stored by the user and associated with the telephone number of the sender (Tommy). Alternatively, the information-reception event processing unit 163 can display the entire message, in order, according to the settings.

When the user selects the second information icon 53 and moves the icon 53 to the area of the state information supporting icon 50 on the display unit 141 as shown in diagram 503, the information-reception event processing unit 163 displays summary information regarding the second information icon 53 on the area as shown in diagram 505. That is, the information-reception event processing unit 163 displays an image of the second information icon 53, a sender's information, and information regarding the property of a corresponding icon, for example, "a missed call." This feature permits the user quickly (at a glance) to check who called.

The user of mobile device can release the touch-lock on the area of the state information supporting icon 50, and may also perform a gesture for simultaneously viewing details of information corresponding to the information icon that is currently displayed on the area. That is, the user can perform a touch gesture on the area of the state information supporting icon 50, for example, touching down on a point on the area and then dragging his/her touch in a certain direction. In that case, the controller 160 concludes that the touch down and drag gesture corresponds to a gesture that releases the touch-lock and performs a detail view function. After that, the controller 160 releases the touch-lock and displays a detail view screen corresponding to an icon that is last displayed on the area of the state information supporting icon 50.

As described above, the mobile device 100 of the invention provides the state information supporting icon 50, thereby performing a function for viewing summary information regarding a variety of information icons. The mobile device 100 can also perform a particular user function of an icon that is displaying summary information using the state information supporting icon 50.

Figure 6:
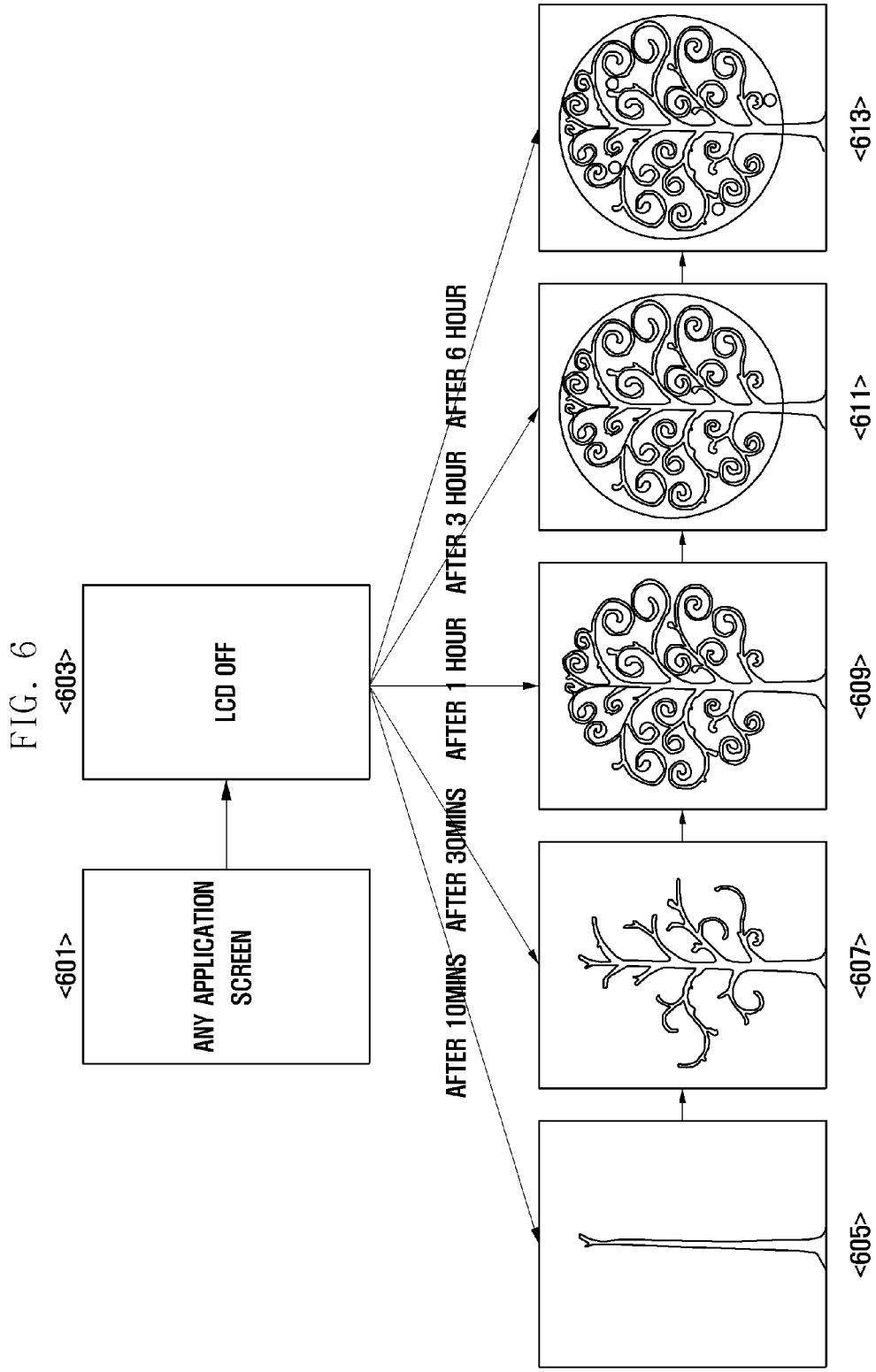
FIG. 6 illustrates screens that show the exemplary operation of the touch-lock idle screen processing unit, according to another exemplary embodiment of the invention.

FIG. 6 illustrates screens that show the operation of the touch-lock idle screen processing unit 165, according to another exemplary embodiment of the invention.

Referring now to FIG. 6, when a particular user function is activated, or a user's input does not occur within a preset period of time, or a particular input signal occurs, while the mobile device 100 is operated in an idle state as shown in diagram 601, the mobile device 100 can change the current state to a touch-lock state as shown in diagram 603. The touch-lock idle screen processing unit 165 can break electric power supplied to the display unit 141 immediately after the mobile device 100 changes the current state to a touch-lock state.

After that, the touch-lock idle screen processing unit 165 can perform a control operation to alter a growing form of an image on the display unit as a period of time elapses. Alternatively, the touch-lock idle screen processing unit 165 can display a growing form of an image on the display unit 141 while an information reception event does not occurs. When an information reception event occurs during the display of the growing form of an image on the display unit 141, the touch-lock idle screen processing unit 165 stops displaying it and then displays a touch-lock idle screen image according to the event that occurred.

The growing form of an image may be altered according to state information regarding the mobile device 100. For example, the growing form of an image may be altered according to the elapsed time between a time point when the current state of the mobile device 100 is changed to a touch-lock state and a time point when an information reception event occurs or the user releases the touch-lock. In other words, as the image is shown on the screen from diagram 605 towards diagram 613, the touch-lock idle screen processing unit 165 alters the form of the image to show the image gradually growing as time elapses. Therefore, the user can intuitively recognize that a certain period of time has elapsed by viewing the images as shown in diagrams 605, 607, 609, 611 and 613. In addition, the user can also note that no information reception events have occurred while a certain period of time has elapsed.

As described above, even while the mobile device 100 is in a touch-lock state, the touch-lock idle screen processing unit 165 can display an idle screen image, via which the user can intuitively recognize the state information regarding the mobile device 100, on the display unit 141, thereby allowing the user to conveniently use the mobile device 100.

In the foregoing description, the configuration, operation and user interface of the mobile device 100, according to the invention, are explained. The following description provides a touch-lock operating method adapted to the mobile device 100 with referring to FIG. 7.

Figure 7:
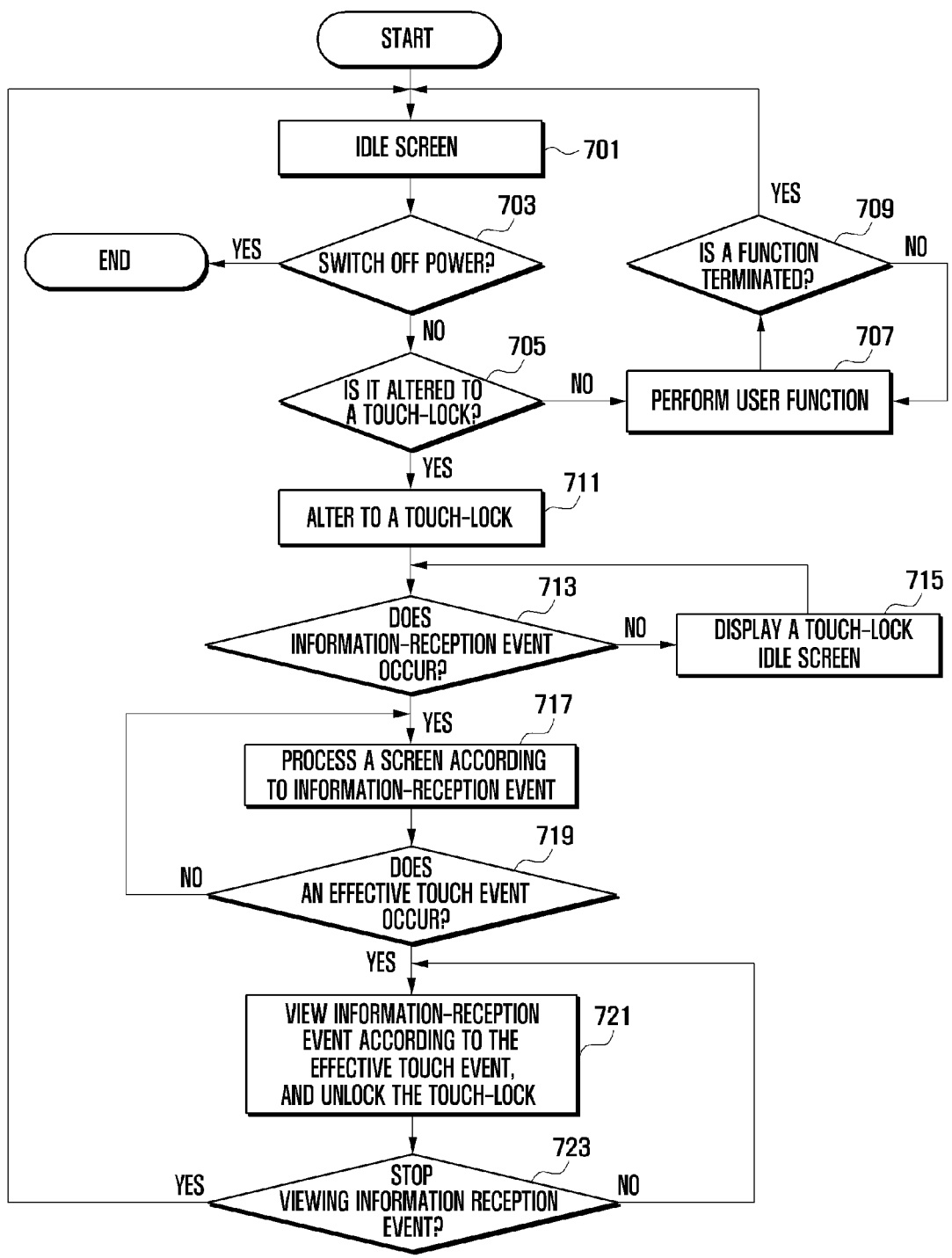
FIG. 7 illustrates a flow chart that shows exemplary operation of a touch-lock operating method of a mobile device, according to an exemplary embodiment of the invention.

FIG. 7 illustrates a flow chart that shows exemplary operation of a touch-lock operating method of a mobile device, according to an exemplary embodiment of the invention.

Referring now to FIG. 7, when the mobile device 100 is turned on, the controller 160 initializes the components in the mobile device 100 and then performs corresponding jobs according to preset schedule information. For example, at (701), the controller 160 can control the display unit 141 to display an idle screen according to preset schedule information.

Next, at (703) the controller 160 determines whether a signal for powering the mobile device 100 off is input.

When the controller 160 ascertains that a signal for powering the mobile device 100 off is not input at step 703, then at (705) the controller 160 determines whether a situation requiring an alteration to the touch-lock occurs. In an exemplary embodiment of the invention, the alteration to touch-lock may occur when an input signal is not input within a preset period of time or an input signal for an alteration to the touch-lock is input.

When the controller 160 ascertains that there is no situation requiring an alteration to the touch-lock at step 705, then at (707) the controller performs a user function according to the occurrence of an input signal. The user function preferably refers to a variety of different functions provided by the mobile device 100, such as a call function, a file reproduction function, a broadcast hearing, a message transmission/reception function, game activation, music activation, a file search function, etc.

After performance of the user function at (707), at (709) the controller 160 determines whether a signal for terminating a corresponding function is input. When at (709) the controller 160 ascertains that a signal for terminating a corresponding function is input, the controller proceeds with step (701).

In another exemplary embodiment, while the controller 160 is performing a user function at step 707, a situation requiring an alteration to the touch-lock may occur. In that case, the controller 160 may proceed with step 711 that will be described below.

Meanwhile, when the controller 160 ascertains that a situation requiring an alteration to the touch-lock occurs at step 705, the controller at (711) alters the current state to a touch-lock state (711). The controller 160 loads a touch-lock operating program. The controller 160 also displays a touch-lock idle screen image according to the execution of the touch-lock operating program or breaks electric power supplied to the display unit 141.

After altering the current state to a touch-lock state at step (711), then at (713) the controller 160 determines whether an information reception event has occurred in the touch-lock state. When the controller 160 ascertains that an information reception event does not occur at step (713), at (715) the controller displays a touch-lock idle screen, or retains, when a touch-lock idle screen has already been displayed, the displaying of the touch-lock idle screen. After that, the controller 160 returns to and proceeds with step (713).

In another exemplary embodiment, at (715) when an input signal for releasing the touch-lock state occurs, the controller 160 returns to and proceeds with step (701) or (707) according to the state before the alteration to a touch-lock state.

On the contrary, when the controller 160 ascertains that an information reception event occurs at step (713), at (717) the controller 160 performs a screen process according to the information reception event that occurred. The information-reception event processing unit 163 of the controller 160 displays, on the display unit 141, an icon corresponding to the event that occurred according to the reception of information. The information-reception event processing unit 163 also partially releases the touch-lock state on the region of the touch panel 143, corresponding to a position where a corresponding icon is displayed.

Next, at (719), the controller 160 determines whether an effective touch event occurs. The effective touch event occurs on a position where the icon is displayed. The effective touch event may also occur in an area where the touch-lock state is partially unlocked. When the controller 160 ascertains that an effective touch event does not occur at step (719), it returns to and proceeds with step (717).

On the contrary, when the controller 160 ascertains that an effective touch event occurs (719), the controller at (721) controls a function for viewing an information reception event and a function for releasing the touch-lock, according to the effective touch event. The information-reception event processing unit 163 can perform a function for viewing the entire information or summary information regarding an icon selected by the touch event, according to the user's settings or the mobile device manufacturer's settings and the type of touch event that occurred. The information-reception event processing unit 163 may be implemented in such that there is no performance of a touch-lock releasing process, with respect to the function for viewing summary information regarding an icon. That is, the information-reception event processing unit 163 can be implemented so that that there is a performance of a touch-lock releasing process only when performing a function for viewing all information regarding an icon.

With continued reference to FIG. 7, at (723) the controller 160 determines whether a signal for terminating the viewing of an information reception event is input. When the controller 160 ascertains that a signal for terminating the viewing of an information reception event is input at step (723), the process returns to and proceeds with step (701).

In another exemplary embodiment, when at (723) the controller 160 ascertains that a signal for terminating the viewing of an information reception event is input, the process returns to and proceeds with step (707).

On the contrary, when the controller 160 ascertains that a signal for terminating the viewing of an information reception event is not input at step (723), the process returns to and proceeds with step (721).

Although the exemplary embodiment discloses that the area where the icon is displayed is only partially released from the touch-lock state, a person of ordinary should understand that in the presently claimed invention, when a touch event occurs on the area where the touch-lock state is partially released, the entire area of the touch panel may be temporarily released from the touch-lock state. That is, after a touch event occurs on the area where the touch-lock state is partially released, the mobile device 100 creates and collects drag events according to the gestures that drag the icons selected by corresponding touches.

As described above, in the touch-lock operating method of the mobile device 100, according to an exemplary embodiment of the invention, when the mobile device 100 changes the current state to a touch-lock state, an idle screen corresponding to the touch-lock state is displayed, and the elapse time in the touch-lock state is shown. In addition, the events created when information is received during the touch-lock are displayed on the display unit 141, so that the user can intuitively recognize the type of received information. The touch-lock operating method, according to an exemplary embodiment of the invention, can also partially release the touch-lock of an icon displayed on the display unit in the touch-lock state, and can then informally perform a user function or a shortcut function, based on a corresponding icon according to a user's control. Therefore, the user can check state information regarding the mobile device in the touch-lock state, and can also rapidly and conveniently execute a user function, based on the state information displayed on the display unit without releasing the touch-lock.

Although the drawings do not illustrate the following attribute of the present invention, the mobile device may be configured to selectively further include units having add-on functions as follows: a short-range communication module for short-range wireless communication; a camera module for photographing a subject/subjects to create still images or moving images; an interface for wireless or wiredly transmitting/receiving data; an Internet communication module for performing communication via the Internet; and a digital broadcast module for receiving and reproducing broadcast. With the spread of digital convergence, although the mobile device are too various to list their modifications in this description, the artisan will appreciate that the other units equivalent to the above-listed units may be further included to the mobile device according to the invention. Also, the artisan will be appreciate that, according to the purposes, the mobile device may be implemented by omitting a particular element or replacing it with other elements.

The mobile device 100 according to the present invention preferably includes all information communication devices, multimedia devices, and their applications, only if they support a touch-lock state and are operated according to communication protocols corresponding to a variety of communication systems. For example, the mobile device 100 can be applied to mobile communication terminals, Portable Multimedia Players (PMPs), digital broadcast players, Personal Digital Assistants (PDAs), audio players (e.g., MP3 players), mobile game players, smart phones, laptop computers, handheld PC, etc.

The above-described methods according to the present invention can be realized in hardware or via the execution of software or computer code that can be stored in a non-transitory recording medium such as a CD ROM, a RAM, thumbnail drive, a floppy disk, a flash storage, a hard disk, or a magneto-optical disk or downloaded over a network and stored in storage, so that the methods described herein can be executed by such software using a general purpose computer, special computer, microprocessor, special processor, or in a programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

As described above, the mobile device having a touch-lock state and the method adapted thereto, according to the present invention, can output information regarding a variety of states of the mobile device in a touch-lock state, and can provide detailed information, according to a user's control operation.

Although exemplary embodiments of the invention have been described in detail hereinabove, a person of ordinary skill in the art should understand and appreciate that many variations and modifications of the basic inventive concept herein described, which might be apparent to those skilled in the art, will still fall within the spirit and scope of the exemplary embodiments of the invention as defined in the appended claims.

What is claimed is:

1. An electronic device comprising:
a display unit; and
a controller configured to:
transition the electronic device into a lock state;
display a first indication of a first missed call, the first indication being displayed while the electronic device is in the lock state;
display a second indication of a second missed call, the second indication being displayed while the electronic device is in the lock state;
responsive to a first input event generated at a first location in the display unit where the first indication is displayed, transition the electronic device out of the lock state and activate a function corresponding to the first missed call; and
responsive to a second input event generated at a second location in the display unit where the second indication is displayed, transition the electronic device out of the lock state and activate a function corresponding to the second missed call,
wherein the first indication and the second indication are displayed concurrently on the display unit.

2. The electronic device of claim 1, wherein the first indication and the second indication are displayed according to an order in which the first missed call and the second missed are received at the electronic device.

3. The electronic device of claim 1, wherein displaying the first indication includes configuring a portion of the display unit where the first indication is displayed as a region for unlocking the electronic device.

4. The electronic device of claim 1, wherein the electronic device is transitioned out of the lock state only when the first input event is of a pre-designated type.

5. The electronic device of claim 1, wherein:
activating the function corresponding to the first missed call includes displaying information associated with the first missed call; and
activating the function corresponding to the second missed call includes displaying information associated with the second missed call.

6. The electronic device of claim 1, wherein the controller is further configured to:
display a lock idle screen image when the first indication is displayed; and
change a characteristic of the lock idle screen image when the second indication is subsequently displayed.

7. The electronic device of claim 6, wherein the characteristic of the lock idle screen image is size, such that the lock idle screen image grows in size when the second indication is displayed.

8. The electronic device of claim 1, wherein the first input event includes a first drag that is received at the first location in the display unit and the second event includes a second drag that is received at the second location in the display unit.

9. A method comprising:
transitioning an electronic device into a lock state;
displaying, on a display unit of the electronic device, a first indication of a first missed call, the first indication being displayed while the electronic device is in the lock state;
displaying, concurrently with the first indication, a second indication of a second missed call, the second indication being displayed while the electronic device is in the lock state;
responsive to a first input event generated at a first location in the display unit where the first indication is displayed, transitioning the electronic device out of the lock state and activating a function corresponding to the first missed call; and
responsive to a second input event generated at a second location in the display unit where the second indication is displayed, transitioning the electronic device out of the lock state and activating a function corresponding to the second missed call.

10. The method of claim 9, wherein the first indication and the second indication are displayed according to an order in which the first missed call and the second missed are received at the electronic device.

11. The method of claim 9, wherein displaying the first indication includes configuring a portion of the display unit where the first indication is displayed as a region for unlocking the electronic device.

12. The method of claim 9, wherein the electronic device is transitioned out of the lock state only when the first input event is of a pre-designated type.

13. The method of claim 9, wherein:
activating the function corresponding to the first missed call includes displaying information associated with the first missed call; and activating the function corresponding to the second missed call includes displaying information associated with the second missed call.

14. The method of claim 9 further comprising:
displaying a lock idle screen image when the first indication is displayed; and
changing a characteristic of the lock idle screen image when the second indication is subsequently displayed.

15. The method of claim 14, wherein the characteristic of the lock idle screen image is size, such that the lock idle screen image grows in size when the second indication is displayed.

16. The method of claim 9, wherein the first input event includes a first drag that is received at the first location in the display unit and the second event includes a second drag that is received at the second location in the display unit.

17. An electronic device comprising:
a display unit; and
a controller configured to:
lock the electronic device;
while the electronic device is locked, display on the display unit, a plurality of indications of information reception events, wherein:
(i) each of the information reception events is generated in response to an incoming communication initiated by a different far-end party, and
(ii) each indication in the plurality indicates a different one of the information reception events;
receive an input in a portion of the display unit where a first one of the plurality of indications is displayed; and
in response to receiving the input, unlock the electronic device and activate a function corresponding to the first indication.

18. The electronic device of claim 17, wherein each indication in the plurality indicates only one of the information reception events.

19. The electronic device of claim 17, wherein the information reception events include at least one of a missed call event and a received text message event and the incoming communication includes at least one of a missed call and a text message.

20. The electronic device of claim 17, wherein the first indication corresponds to a missed call event.

21. The electronic device of claim 17, wherein the controller is further configured to, for each indication, configure a portion of the display unit where the indication is displayed as a region for unlocking the electronic device.

22. The electronic device of claim 17, wherein:
the plurality of indications is displayed as part of a first screen that is presented on the display unit; and
activating the function includes removing the first screen from display and displaying a second screen including information corresponding to a first information reception event that is indicated by the first indication, the second screen being displayed in full screen mode.

23. The electronic device of claim 17, wherein the controller is further configured to display a lock idle screen image based on a count of the indications in the plurality.

24. A method comprising:
locking an electronic device;
while the electronic device is locked, displaying on a display unit of the electronic device, a plurality of indications of information reception events, wherein:
(i) each of the information reception events is generated in response to an incoming communication initiated by a different far-end party, and
(iii) each indication in the plurality indicates a different one of the information reception events;
receiving an input in a portion of the display unit where a first one of the plurality of indications is displayed; and
in response to receiving the input, unlocking the electronic device and activating a function corresponding to the first indication.

25. The method of claim 24, wherein each indication in the plurality indicates only one of the information reception events.

26. The method of claim 24 wherein the information reception events include at least one of a missed call event and a received text message event and the incoming communication includes at least one of a missed call and a text message.

27. The method of claim 24, wherein the first indication corresponds to a missed call event.

28. The method of claim 24, further comprising, for each indication, configuring a portion of the display unit where the indication is displayed as a region for unlocking the electronic device.

29. The method of claim 24, wherein:
the plurality of indications is displayed as part of a first screen that is presented on the display unit; and
activating the function includes removing the first screen from display and displaying a second screen including information corresponding to a first information reception event that is indicated by the first indication, the second screen being displayed in full screen mode.

30. The method of claim 24, further comprising displaying a lock idle screen image based on a count of the indications in the plurality.

* * * * *

UNITED STATES PATENT AND TRADEMARK OFFICE
CERTIFICATE OF CORRECTION

PATENT NO. : 8,982,098 B2
APPLICATION NO. : 14/274868
DATED : March 17, 2015
INVENTOR(S) : Tae Yeon Kim et al.

Page 1 of 1

It is certified that error appears in the above-identified patent and that said Letters Patent is hereby corrected as shown below:

In the Claims

Column 18, Claim 2, Line 3 should read as follows:
--...second missed call are...--

Column 18, Claim 10, Line 54 should read as follows:
--...second missed call are...--

Column 19, Claim 14, Line 4 should read as follows:
--...claim 9, further comprising...--

Column 20, Claim 24, Line 17 should read as follows:
--...(ii) each indication in...--

Column 20, Claim 26, Line 27 should read as follows:
--...claim 24, wherein the...--

Signed and Sealed this
Twenty-third Day of June, 2015

Michelle K. Lee
*Director of the United States Patent and Trademark Office*